United States Patent
Eriksson Löwenmark et al.

(10) Patent No.: US 10,390,318 B2
(45) Date of Patent: *Aug. 20, 2019

(54) PROVIDING ESTIMATED ACCURACY OF MOBILE STATION SYNCHRONIZATION TO THE NETWORK

(71) Applicant: TELEFONAKTIEBOLAGET LM ERICSSON (PUBL), Stockholm (SE)

(72) Inventors: Stefan Eriksson Löwenmark, Färentuna (SE); Nicklas Johansson, Brokind (SE); John Walter Diachina, Garner, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 4 days.

This patent is subject to a terminal disclaimer.

(21) Appl. No.: 15/798,928

(22) Filed: Oct. 31, 2017

(65) Prior Publication Data

US 2018/0124720 A1    May 3, 2018

Related U.S. Application Data

(60) Provisional application No. 62/415,990, filed on Nov. 1, 2016.

(51) Int. Cl.
| | | |
|---|---|---|
| *H04W 56/00* | (2009.01) |
| *G01S 5/02* | (2010.01) |
| *H04W 4/02* | (2018.01) |
| *H04W 64/00* | (2009.01) |
| *G01S 5/00* | (2006.01) |
| *G01S 5/06* | (2006.01) |
| *G01S 5/10* | (2006.01) |

(52) U.S. Cl.
CPC ............. *H04W 56/001* (2013.01); *G01S 5/00* (2013.01); *G01S 5/0036* (2013.01); *G01S 5/0236* (2013.01); *G01S 5/06* (2013.01); *G01S 5/10* (2013.01); *H04W 4/02* (2013.01); *H04W 56/0065* (2013.01); *H04W 64/006* (2013.01); *G01S 5/0081* (2013.01); *H04W 64/00* (2013.01)

(58) Field of Classification Search
None
See application file for complete search history.

(56) References Cited

U.S. PATENT DOCUMENTS

2014/0368387 A1* 12/2014 Beutler ................. G01S 5/0278
    342/463
2016/0286357 A1* 9/2016 Edge ..................... G01S 5/0018

FOREIGN PATENT DOCUMENTS

EP        2 595 436 A1    5/2013
WO    2013/150344 A1   10/2013

OTHER PUBLICATIONS

RP-161260 (revision of RP-161033), "New Work Item on Positioning Enhancements for GERAN", source Ericsson LM, Orange, MediaTek Inc., Sierra Wireless, Nokia. 3GPP TSG RAN Meeting #72, Busan, Korea, Jun. 13-16, 2016, the whole document.

(Continued)

*Primary Examiner* — Christine T Duong

(57) ABSTRACT

A mobile station (MS), a base station subsystem (BSS), and various methods are described herein that enable a positioning node (e.g., Serving Mobile Location Center (SMLC)) to improve the accuracy of estimating a position of the mobile station.

16 Claims, 10 Drawing Sheets

(56) References Cited

OTHER PUBLICATIONS

RP-161034, "Positioning Enhancements for GERAN—introducing TA trilateration", source Ericsson LM. 3GPP TSG RAN#72, Busan, Korea, Jun. 13-16, 2016, the whole document.
R1-167426, "On timing advance based multi-leg positioning for NB-IoT", source Ericsson, GPP TSG-RAN1 Meeting #86, Gothenburg, Sweden, Aug. 22-26, 2016 the whole document.
3GPP TS 45.010 V13.3.0 (Sep. 2016), 3rd Generation Partnership Project; Technical Specification Group Radio Access Network; GSM/EDGE Radio subsystem synchronization (Release 13), "GSM/EDGE Radio subsystem synchronization", upload date Sep. 30, 2016, the whole document.
3GPP TS 24.008 V14.1.0 (Sep. 2016), 3rd Generation Partnership Project; Technical Specification Group Core Network and Terminals; Mobile radio interface Layer 3 specification; Core network protocols; Stage 3 (Release 14), upload date Sep. 30, 2016, the whole document.
3GPP TS 44.060 V13.3.0 (Sep. 2016), 3rd Generation Partnership Project; Technical Specification Group Radio Access Network; General Packet Radio Service (GPRS); Mobile Station (MS)—Base Station System (BSS) interface; Radio Link Control / Medium Access Control (RLC/MAC) protocol (Release 13), upload date Sep. 30, 2016, the whole document.
3GPP TS 49.031 V13.0.0 (Jan. 2016), 3rd Generation Partnership Project; Technical Specification Group GSM/EDGE Radio Access Network; Location Services (LCS); Base Station System Application Part LCS Extension (BSSAP-LE) (Release 13), Jan. 4, 2016 (Jan. 4, 2016), pp. 1-52.
Ericsson LM: "System level simulations for positioning enhancements—Methods and Results", Tdoc R6-160012, 3GPP TSG RAN6#1, Gothenburg, Sweden, Aug. 22-26, 2016, the whole document.
Nokia: "Serving Cell TA Estimation for Multilateration Positioning", 3GPP TSG RAN WG6 #3, R6-170045, Athens, Greece, Feb. 13-17, 2017, the whole document.
3GPP TS 43.059 V14.2.0 (Sep. 2017), 3rd Generation Partnership Project; Technical Specification Group Radio Access Network;Functional stage 2 description of Location Services (LCS) in GERAN (Release 14), Sep. 25, 2017 (Sep. 25, 2017), pp. 1-83.
3GPP TS 45.010 V14.2.0 (Sep. 2017), 3rd Generation Partnership Project; Technical Specification Group Radio Access Network;GSM/EDGE Radio subsystem synchronization(Release 14), Sep. 13, 2017 (Sep. 13, 2017), 37 pages.
LM Ericsson: "Analysis of MS Transmission Accuracy", 3GPP Draft; R6-170004, RAN WG6 Meeting#3, Feb. 13-17, 2017, Athens, Greece, Feb. 12, 2017 (Feb. 12, 2017), 5 pages.

* cited by examiner

TABLE 9.1 3GPP TS 49.031 BSSMAP-LE PERFORM LOCATION REQUEST MESSAGE

| INFORMATION ELEMENT | TYPE/REFERENCE | PRESENCE | FORMAT | LENGTH IN OCTETS |
|---|---|---|---|---|
| MESSAGE TYPE | MESSAGE TYPE | M | V | 1 |
| LOCATION TYPE | LOCATION TYPE | M | TLV | 3-4 |
| CELL IDENTIFIER | CELL IDENTIFIER | M | TLV | 3-10 |
| CLASSMARK INFORMATION TYPE 3 | CLASSMARK INFORMATION TYPE 3 | O | TLV | 2-n |
| LCS CLIENT TYPE | LCS CLIENT TYPE | C | TLV | 3 |
| CHOSEN CHANNEL | CHOSEN CHANNEL | O | TLV | 2-n |
| LCS PRIORITY | LCS PRIORITY | O | TLV | 3 |
| LCS QoS | LCS QoS | O | TLV | 6 |
| REQUESTED GPS ASSISTANCE DATA | REQUESTED GPS ASSISTANCE DATA | O | TLV | 3-n |
| BSSLAP APDU | APDU | O | TLV | 2-n |
| LCS CAPABILITY | LCS CAPABILITY | O | TLV | 3-n |
| PACKET MEASUREMENT REPORT | PACKET MEASUREMENT REPORT | O | TLV | 2-n |
| MEASURED CELL IDENTITY LIST | CELL IDENTITY LIST | O | TLV | 6-n |
| IMSI | IMSI | O (NOTE 1) | TLV | 5-10 |
| IMEI | IMEI | O (NOTE 1) | TLV | 10 |
| GANSS LOCATION TYPE | GANSS LOCATION TYPE | C | TLV | 3 |
| REQUESTED GANSS ASSISTANCE DATA | REQUESTED GANSS ASSISTANCE DATA | O | TLV | 3-n |
| MS SYMBOL GRANULARITY CAPABILITY | MS SYMBOL GRANULARITY CAPABILITY | O (NOTE 2) | TLV | 3 |
| NOTE 1: THE IMSI SHOULD BE SENT PREFERABLY IF KNOWN. THE IMEI COULD BE SENT IF THE IMSI IS NOT KNOWN, OR IN ADDITION TO THE IMSI FOR THE PURPOSE OF ALLOWING CORRELATION BETWEEN THE TWO IDENTITIES. NOTE 2: THIS IE IS INCLUDED WHEN THE BSS SUPPORTS THE MULTILATERATION PROCEDURE. | | | | |

266 (MS SYMBOL GRANULARITY CAPABILITY row)

266

10.34 MS SYMBOL GRANULARITY CAPABILITY (3GPP TS 49.031)

| | 8 | 7 | 6 | 5 | 4 | 3 | 2 | 1 |
|---|---|---|---|---|---|---|---|---|
| OCTET 1 | IEI ||||||||
| OCTET 2 | LENGTH INDICATOR ||||||||
| OCTET 3 | SPARE |||| MS SYMBOL CAPABILITY ||||

MS SYMBOL CAPABILITY (BITS 1 TO 3 OF OCTET 3)

3 2 1
0 0 0   MS SUPPORTS 1 SYMBOL GRANULARITY
0 0 1   MS SUPPORTS 1/2 SYMBOL GRANULARITY
0 1 0   MS SUPPORTS 1/4 SYMBOL GRANULARITY
0 1 1   MS SUPPORTS 1/8 SYMBOL GRANULARITY

ALL REMAINING VALUES ARE RESERVED

267

*Table 10.5.146/3GPP TS 24.008:* MS*Radio Access Capability Information Element*

```
<MS RA capability value part > ::=
    < MS RA capability value part struct >
    <spare bits>**;  -- may be used for future enhancements <MS RA capability value part struct >::=   -- recursive structure allows any number of Access technologies
{    {      <Access Technology Type  : bit (4) > exclude 1111
            <Access capabilities  : <Access capabilities struct> > }

|   {    <Access Technology Type  : bit (4) == 1111 >  -- structure adding Access
technologies with same capabilities
            <Length  : bit (7) >          -- length in bits of list of Additional access
technologies and spare bits
            < bit (val (Length))
            & {
                    { 1 <Additional access technologies  : < Additional access technologies
struct > > } ** 0
                    <spare bits>**
            } >
        }
    }

{ 0 | 1 <MS RA capability  value part struct> } ;

< Additional access technologies struct > ::=
    <Access Technology Type  : bit (4) >
    <GMSK Power Class  : bit (3) >
    <8PSK Power Class  : bit (2) > ;

....

-- Additions in release 13
        <(EC-)PCH monitoring support:  bit(2)>

-- Additions in release 14
        <MS Symbol Granularity Capability  : bit(3) >;
        error: struct too short, assume features do not exist
        error: struct too long, ignore data and jump to next Access technology
```

Table 10.5.146/3GPP TS 24.008 (continued): MSRadio Access Capability IE

< Multislot capability struct > ::=
    { 0 | 1 <HSCSD multislot class : bit (5) > }
    { 0 | 1 <GPRS multislot class : bit (5) > <GPRS Extended Dynamic Allocation Capability : bit > }
    { 0 | 1 < SMS_VALUE : bit (4) > < SM_VALUE : bit (4) > }
-- Additions in release 99
    { 0 | 1 <ECSD multislot class : bit (5) > }
    { 0 | 1 <EGPRS multislot class : bit (5) > < EGPRS Extended Dynamic Allocation Capability: bit > }
    { 0 | 1    <DTM GPRS Multi Slot Class : bit(2)>
            <Single Slot DTM : bit>
            {0 | 1 <DTM EGPRS Multi Slot Class : bit(2)> } } ;
    -- error: struct too short, assume features do not exist <A5 bits> ::= < A5/1 : bit> <A5/2 : bit> <A5/3 : bit> <A5/4 : bit> <A5/5 : bit> <A5/6 : bit> <A5/7 : bit>; -- bits for circuit mode ciphering algorithms. These fields are not used by the network and may be excluded by the MS.

< Enhanced Flexible Timeslot Assignment struct > ::=
    { 0 | 1    <Alternative EFTA Multislot Class : bit(4) >
            EFTA Multislot Capability Reduction for Downlink Dual Carrier : bit (3) > };

< DLMC Capability struct > ::=
    { 0 | 1    DLMC - Non-contiguous intra-band reception : bit(2) >
            <DLMC - Inter-band reception : bit(1) > }
    <DLMC - Maximum Bandwidth : bit(2) >
    DLMC - Maximum Number of Downlink Timeslots : bit(6) >
    DLMC - Maximum Number of Downlink Carriers : bit(3) > ;
...

(EC-)PCH monitoring support (2 bit field)
This field indicates if the mobile station is capable of monitoring the PCH channel, the EC-PCH channel or both for paging based reachability.

Bit
2 1
0 0     PCH supported
0 1     EC-PCH supported
1 0     PCH and EC-PCH supported
1 1     reserved
EC-PCH support also indicates EC-GSM-IoT capability, see 3GPP TS 43.064 [159].

MS Symbol Granularity Capability (3 bit field)

3 2 1
0 0 0     MS supports 1 symbol granularity
0 0 1     MS supports 1/2 symbol granularity
0 1 0     MS supports 1/4 symbol granularity
0 1 1     MS supports 1/8 symbol granularity All remaining values are reserved

266

277

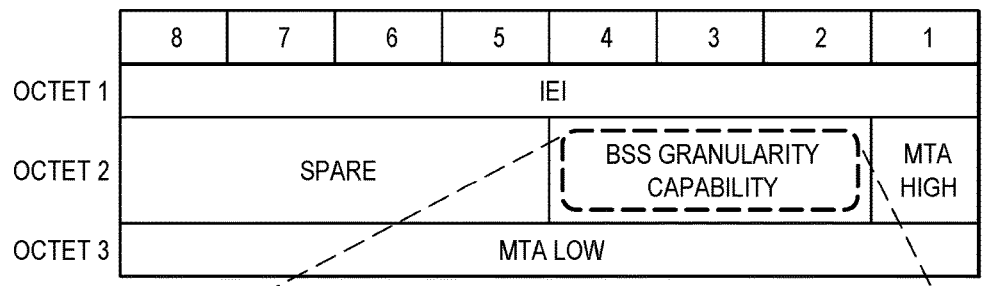

TABLE 10.37.1: MTA INFORMATION ELEMENTS

BSS GRANULARITY CAPABILITY (BITS 2 TO 4 OF OCTET 3)

THIS FIELD INDICATES THE SYMBOL GRANULARITY USED BY THE BSS WHEN ESTIMATING TIMING ADVANCE DURING THE MTAO PROCEDURE AND IS CODED AS FOLLOWS:

3 2 1
0 0 0   BSS SUPPORTS 1 SYMBOL GRANULARITY
0 0 1   BSS SUPPORTS 1/2 SYMBOL GRANULARITY
0 1 0   BSS SUPPORTS 1/4 SYMBOL GRANULARITY
0 1 1   BSS SUPPORTS 1/8 SYMBOL GRANULARITY

ALL OTHER VALUES ARE RESERVED

MULTILATERATION TIMING ADVANCE (MTA) (OCTETS 2 AND 3)

THE CODING OF THE MTA FIELD IS THE BINARY REPRESENTATION OF THE TIMING ADVANCE VALUE IN 1 SYMBOL INCREMENTS (VALUES 0 TO 63), 1/2 SYMBOL INCREMENTS (VALUES 0 TO 127), 1/4 SYMBOL INCREMENTS (VALUES 0 TO 255) OR 1/8 SYMBOL INCREMENTS (VALUES 0 TO 511). THE INTERPRETATION OF THIS FIELD IS BASED ON THE VALUE OF THE BSS GRANULARITY CAPABILITY FIELD; 1 SYMBOL PERIOD = 48/13 µs

FIG. 7

PROVIDING ESTIMATED ACCURACY OF MOBILE STATION SYNCHRONIZATION TO THE NETWORK

CLAIM OF PRIORITY

This application claims the benefit of priority to U.S. Provisional Application Ser. No. 62/415,990, filed on Nov. 1, 2016, the entire contents of which are hereby incorporated herein by reference for all purposes.

RELATED PATENT APPLICATIONS

This application is related to the co-filed U.S. patent application Ser. No. 15/799,037 entitled "Providing Estimated Accuracy of Mobile Station Synchronization and Mobile Station Transmission Offset to the Network". This application is also related to the co-filed U.S. patent application Ser. No. 15/798,952 entitled "Providing Estimated Accuracy of Mobile Station Synchronization to the Network".

TECHNICAL FIELD

The present disclosure relates generally to the wireless telecommunications field and, more particularly, to a mobile station (MS), a base station subsystem (BSS), and various methods that enable a positioning node (e.g., Serving Mobile Location Center (SMLC)) to improve the accuracy of estimating a position of the mobile station.

BACKGROUND

The following abbreviations are herewith defined, at least some of which are referred to within the following description of the present disclosure.
3GPP 3rd-Generation Partnership Project
APDU Application Protocol Data Unit
ASIC Application Specific Integrated Circuit
BSS Base Station Subsystem
BBSLAP Base Station Subsystem Location Services Assistance Protocol
BSSMAP Base Station Subsystem Mobile Application Part
BSSMAP-LE BSSMAP-Location Services Extension
BTS Base Transceiver Station
CN Core Network
DSP Digital Signal Processor
EC Extended Coverage
EC-GSM Extended Coverage Global System for Mobile Communications
EDGE Enhanced Data rates for GSM Evolution
EGPRS Enhanced General Packet Radio Service
eNB Evolved Node B
GSM Global System for Mobile Communications
GERAN GSM/EDGE Radio Access Network
GPRS General Packet Radio Service
IE Information Element
IoT Internet of Things
LAC Location Area Code
LTE Long-Term Evolution
MCC Mobile Country Code
MME Mobility Management Entity
MNC Mobile Network Code
MS Mobile Station
MTA Multilateration Timing Advance
MTC Machine Type Communications
NB-IoT Narrow Band Internet of Things
PDN Packet Data Network
PDU Protocol Data Unit
PLMN Public Land Mobile Network
RAN Radio Access Network
RLC Radio Link Control
SGSN Serving GPRS Support Node
SMLC Serving Mobile Location Center
TA Timing Advance
TBF Temporary Block Flow
TLLI Temporary Logical Link Identifier
TS Technical Specification
TSG Technical Specification Group
UE User Equipment
UL Uplink
WCDMA Wideband Code Division Multiple Access
WiMAX Worldwide Interoperability for Microwave Access At the 3rd-Generation Partnership Project (3GPP) Technical Specification Group (TSG) Radio Access Network (RAN) Meeting #72, a Work Item on "Positioning Enhancements for GERAN" was approved (see RP-161260; Busan, Korea; 13-16 Jun. 2016—the contents of which are hereby incorporated herein by reference), wherein one candidate method for realizing improved accuracy when determining the position of a mobile station (MS) is timing advance (TA) multilateration (see RP-161034; Busan, Korea; 13-16 Jun. 2016—the contents of which are hereby incorporated herein by reference), which relies on establishing the MS position based on TA values in multiple cells.

At the 3GPP TSG-RAN1 Meeting #86, a proposal based on a similar approach was made also to support positioning of Narrow Band Internet of Things (NB-IoT) mobiles (see R1-167426; Gothenburg, Sweden; 22-26 Aug. 2016—the contents of which are hereby incorporated herein by reference).

TA is a measure of the propagation delay between a base transceiver station (BTS) and the MS, and since the speed by which radio waves travel is known, the distance between the BTS and the MS can be derived. Further, if the TA applicable to the MS is measured within multiple BTSs and the positions of these BTSs are known, the position of the MS can be derived using the measured TA values. The measurement of the TA requires that the MS synchronize to each neighbor BTS and transmit a signal time-aligned with the estimated timing of the downlink channel received from each BTS. The BTS measures the time difference between its own time reference for the downlink channel, and the timing of the received signal (transmitted by the MS). This time difference is equal to two times the propagation delay between the BTS and the MS (one propagation delay of the BTS's synchronization signal sent on the downlink channel to the MS, plus one equal propagation delay of the signal transmitted by the MS back to the BTS).

Once the set of TA values are established using a set of one or more BTSs during a given positioning procedure, the position of the MS can be derived through so called multilateration wherein the position of the MS is determined by the intersection of a set of hyperbolic curves associated with each BTS (see FIG. 1). The calculation of the position of the MS is typically carried out by a serving positioning node (i.e., serving Serving Mobile Location Center (SMLC)), which implies that all of the derived TA and associated BTS position information needs to be sent to the positioning node (i.e., the serving SMLC) that initiated the positioning procedure.

Referring to FIG. 1 (PRIOR ART) there is shown a diagram of an exemplary wireless communication network 100 used to help explain a problem associated with the traditional multilateration process in determining a position of a mobile station 102 (MS 102). The exemplary wireless communication network 100 has several nodes which are shown and defined herein as follows:

Foreign BTS $104_3$: A BTS $104_3$ (shown as foreign BTS3 $104_3$) associated with a BSS $106_3$ (shown as non-serving BSS3 $106_3$) that uses a positioning node $108_2$ (shown as non-serving SMLC2 $108_2$) that is different from a positioning node (shown as serving SMLC1 $108_1$) which is used by the BSS $106_1$ (shown as serving BSS1 $106_1$) that manages the cell serving the MS 102 when the positioning (multilateration) procedure is initiated. The derived TA information (TA3 $114_3$) and identity of the corresponding cell are relayed by the BSS $106_3$ (shown as non-serving BSS3 $106_3$), the SGSN 110 (core network), and the BSS $106_1$ (shown as serving BSS1 $106_1$) to the serving positioning node (shown as serving SMLC1 $108_1$) (i.e., in this case the non-serving BSS3 $106_3$ has no context for the MS 102). The BSS $106_3$ (shown as non-serving BSS3 $106_3$) can be associated with one or more BTSs $104_3$ (only one shown) and a BSC $112_3$ (shown as non-serving BSC3 $112_3$).

Local BTS $104_2$: A BTS $104_2$ (shown as local BTS2 $104_2$) associated with a BSS $106_2$ (shown as non-serving BSS2 $106_2$) that uses the same positioning node $108_1$ (shown as serving SMLC1 $108_1$) as the BSS $106_1$ (shown as serving BSS1 $106_1$) that manages the cell serving the MS 102 when the positioning (multilateration) procedure is initiated. The derived TA information (TA2 $114_2$) and identity of the corresponding cell are relayed by the BSS $106_2$ (shown as non-serving BSS2 $106_2$) and the BSS $106_1$ (shown as serving BSS1 $106_1$) to the serving positioning node (shown as serving SMLC1 $108_1$) (i.e., in this case the non-serving BSS2 $106_2$ has no context for the MS 102) (i.e., inter-BSS communications allows the non-serving BSS2 $106_2$ to relay the derived TA information (TA2 $114_2$) and the identity of the corresponding cell to the serving BSS1 $106_1$). The BSS $106_2$ (shown as non-serving BSS2 $106_2$) can be associated with one or more BTSs $104_2$ (only one shown) and a BSC $112_2$ (shown as non-serving BSC2 $112_2$).

Serving BTS $104_1$: A BTS $104_1$ (shown as serving BTS1 $104_1$) associated with a BSS $106_1$ (shown as serving BSS1 $106_1$) that manages the cell serving the MS 102 when the positioning (multilateration) procedure is initiated. The derived TA information (TA1 $114_1$) and identity of the corresponding cell are sent directly by the BSS $106_1$ (shown as serving BSS1 $106_1$) to the serving positioning node $108_1$ (shown as serving SMLC1 $108_1$) (i.e., in this case the serving BSS1 $106_1$ has a context for the MS 102). The BSS $106_1$ (shown as serving BSS1 $106_1$) can be associated with one or more BTSs $104_1$ (only one shown) and a BSC $112_1$ (shown as serving BSC1 $112_1$).

Serving SMLC $108_1$: The SMLC $108_1$ (shown as serving SMLC1 $108_1$) that commands the MS 102 to perform the positioning (multilateration) procedure (i.e., the SMLC $108_1$ sends a Radio Resource Location services Protocol (RRLP) Multilateration Request to the MS 102).

Serving BSS $106_1$: The BSS $106_1$ (shown as serving BSS1 $106_1$) associated with the serving BTS $104_1$ (shown as serving BTS1 $104_1$) (i.e., the BSS $106_1$ that has context information for the Temporary Logical Link Identity (TLLI) corresponding to the MS 102 for which the positioning (multilateration) procedure has been triggered).

Non-serving BSS $106_2$ and $106_3$: A BSS $106_3$ (shown as non-serving BSS3 $106_3$) associated with a foreign BTS $104_3$ (shown as foreign BTS3 $104_3$) and a BSS $106_2$ (shown as non-serving BSS2 $106_2$) associated with a local BTS $104_2$ (shown as local BTS2 $104_2$) (i.e., the BSSs $106_2$ and $106_3$ do not have context information for the TLLI corresponding to the MS 102 for which the positioning (multilateration) procedure has been triggered).

Note 1: FIG. 1 is an illustration of an exemplary multilateration process involving three BTSs $104_1$, $104_2$, and $104_3$ associated with three timing advance (TA) values $114_1$, $114_2$, $114_3$ for a particular MS 102. The multilateration can involve more than three BTSs $104_1$, $104_2$, and $104_3$ and more than three TA values $114_1$, $114_2$, $114_3$.

Note 2: FIG. 1 is an illustration of an exemplary wireless communication network 100 showing the basic nodes which are needed to explain the positioning (multilateration) process. It should be appreciated that the exemplary wireless communication network 100 includes additional nodes which are well known in the art.

It is advantageous for the serving SMLC $108_1$ to estimate the accuracy of the estimated position of the MS 102. The accuracy of the estimated position of the MS 102 depends on the number of cell specific TA estimates $114_1$, $114_2$, $114_3$ (for example) it has been provided with, the accuracy of the individual (cell specific) TA estimates $114_1$, $114_2$, $114_3$ (for example) as well as the MS-BTS geometry, i.e., the true position of the MS 102 relative to the involved BTSs $104_1$, $104_2$, $104_3$ (for example). The accuracy of the TA estimation in turn depends on the accuracy by which the MS 102 is able to synchronize to the wireless communication network 100, and the accuracy by which each BTS $104_1$, $104_2$, $104_3$ (for example) is able to measure the timing of signals received from the MS 102. The accuracy by which the MS 102 is able to synchronize to the wireless communication network 100 is currently specified as a worst-case tolerance. For example, a Global System for Mobile telephony (GSM) MS 102 is required to synchronize with an accuracy of ±0.5 symbol period (a symbol period being 48/13 µs), see 3GPP Technical Specification (TS) 45.010 V13.3.0 (2016-09)—the contents of this disclosure are incorporated herein by reference.

One problem with the existing solution is that the serving SMLC $108_1$ does not have any information about the TA estimation accuracy of the BTS $104_1$, $104_2$, $104_3$ or about the actual MS synchronization accuracy (MS assessment of the BTS timing). If the serving SMLC $108_1$ assumes that the accuracy by which the MS 102 is able to synchronize to the wireless communication network 100 is according to the specified worst case tolerance, the estimated accuracy of the estimated position of the MS 102 may be overly pessimistic. Therefore, services requiring a higher positioning accuracy may not be provided with a positioning estimate (i.e., it may be concluded that the target positioning accuracy cannot be realized) even though the actual positioning accuracy may in fact be better than estimated and therefore sufficient. Alternatively, the serving SMLC $108_1$ may involve more BTSs $104_1$, $104_2$, $104_3$ than are necessary in the positioning process in order to guarantee sufficient accuracy in the estimated position of the MS 102. These problems and other problems are addressed by the present disclosure.

SUMMARY

A mobile station, a base station subsystem (BSS) and various methods for addressing the aforementioned problems are described in the independent claims. Advantageous embodiments of the mobile station, the BSS and the various methods are further described in the dependent claims.

In one aspect, the present disclosure provides a mobile station configured to interact with a BSS, wherein the BSS includes a BTS. The mobile station comprises a processor and a memory that stores processor-executable instructions, wherein the processor interfaces with the memory to execute the processor-executable instructions, whereby the mobile station is operable to perform a receive operation, an estimate operation, and a transmit operation. In the receive operation, the mobile station receives, from the BSS, a multilateration request. In the estimate operation, the mobile station estimates a synchronization accuracy with the BTS in response to the receipt of the multilateration request. In the transmit operation, the mobile station transmits, to the BSS, a RLC data block that includes at least (i) a TLLI of the mobile station, and (ii) the estimated synchronization accuracy (note: the BSS subsequently relays this information to the SMLC). An advantage of the mobile station performing these operations is that it enables a SMLC to make a better estimate of the accuracy of the estimated position of the mobile station. In addition, for the case where the mobile station does not perform these operations, the BSS can provide the SMLC with the mobile station's transmission timing accuracy capability information received from the SGSN, thus allowing the SMLC to make an a priori assessment as to how many BTSs may be needed to reach the desired position accuracy and thus provide the mobile station with more accurate assistance information.

In another aspect, the present disclosure provides a method in a mobile station that is configured to interact with a BSS, wherein the BSS includes a BTS. The method comprises a receiving step, an estimating step, and a transmitting step In the receiving step, the mobile station receives, from the BSS, a multilateration request. In the estimating step, the mobile station estimates a synchronization accuracy with the BTS in response to receiving the multilateration request. In the transmitting step, the mobile station transmits, to the BSS, a RLC data block that includes at least (i) a TLLI of the mobile station, and (ii) the estimated synchronization accuracy (note: the BSS subsequently relays this information to the SMLC). An advantage of the mobile station performing these steps is that it enables a SMLC to make a better estimate of the accuracy of the estimated position of the mobile station. In addition, for the case where the mobile station does not perform these steps, the BSS can provide the SMLC with the mobile station's transmission timing accuracy capability information received from the SGSN, thus allowing the SMLC to make an a priori assessment as to how many BTSs may be needed to reach the desired position accuracy and thus provide the mobile station with more accurate assistance information.

In yet another aspect, the present disclosure provides a BSS which includes a BTS and is configured to interact with a mobile station. The BSS further comprises a processor and a memory that stores processor-executable instructions, wherein the processor interfaces with the memory to execute the processor-executable instructions, whereby the BSS is operable to perform a transmit operation and a receive operation. In the transmit operation, the BSS transmits, to the mobile station, a multilateration request. In the receive operation, the BSS receives, from the mobile station, a RLC data block that includes at least (i) a TLLI of the mobile station, and (ii) an estimated mobile station synchronization accuracy, wherein the estimated mobile station synchronization accuracy indicates an estimate by the mobile station of an accuracy by which the mobile station is synchronized to the BTS (note: the BSS subsequently relays this information to the SMLC). An advantage of the BSS performing these operations is that it enables a SMLC to make a better estimate of the accuracy of the estimated position of the mobile station. In addition, for the case where the BSS does not perform these operations, the BSS can provide the SMLC with the mobile station's transmission timing accuracy capability information received from the SGSN, thus allowing the SMLC to make an a priori assessment as to how many BTSs may be needed to reach the desired position accuracy and thus provide the mobile station with more accurate assistance information.

In still yet another aspect, the present disclosure provides a method in a BSS which includes a BTS and is configured to interact with a mobile station. The method comprises a transmitting step and a receiving step. In the transmitting step, the BSS transmits, to the mobile station, a multilateration request. In the receiving step, the BSS receives, from the mobile station, a RLC data block that includes at least (i) a TLLI of the mobile station, and (ii) an estimated mobile station synchronization accuracy, wherein the estimated mobile station synchronization accuracy indicates an estimate by the mobile station of an accuracy by which the mobile station is synchronized to the BTS (note: the BSS subsequently relays this information to the SMLC). An advantage of the BSS performing these steps is that it enables a SMLC to make a better estimate of the accuracy of the estimated position of the mobile station. In addition, for the case where the BSS does not perform these steps, the BSS can provide the SMLC with the mobile station's transmission timing accuracy capability information received from the SGSN, thus allowing the SMLC to make an a priori assessment as to how many BTSs may be needed to reach the desired position accuracy and thus provide the mobile station with more accurate assistance information.

In another aspect, the present disclosure provides a BSS which is configured to interact with a SMLC. The BSS comprises a processor and a memory that stores processor-executable instructions, wherein the processor interfaces with the memory to execute the processor-executable instructions, whereby the BSS is operable to perform a transmit operation. In the transmit operation, the BSS transmits, to the SMLC, a BSSMAP-LE PERFORM LOCATION REQUEST message which includes an IE which indicates a worst case synchronization accuracy of a mobile station. An advantage of the BSS performing this operation is that it enables a SMLC to make a better estimate of the accuracy of the estimated position of the mobile station as well as to make an a priori assessment as to how many BTSs may be needed to reach the desired position accuracy and thus provide the mobile station with more accurate assistance information.

In yet another aspect, the present disclosure provides a method in a BSS which is configured to interact with a SMLC. The method comprises a transmitting step. In the transmitting step, the BSS transmits, to the SMLC, a BSSMAP-LE PERFORM LOCATION REQUEST message which includes an IE which indicates a worst case synchronization accuracy of a mobile station. An advantage of the BSS performing this step is that it enables a SMLC to make a better estimate of the accuracy of the estimated position of the mobile station as well as to make an a priori assessment as to how many BTSs may be needed to reach the desired position accuracy and thus provide the mobile station with more accurate assistance information.

In one aspect, the present disclosure provides a BSS which includes a BTS and is configured to interact with a SMLC. The BSS comprises a processor and a memory that stores processor-executable instructions, wherein the processor interfaces with the memory to execute the processor-executable instructions, whereby the BSS is operable to perform a transmit operation. In the transmit operation, the BSS transmits, to the SMLC, a BSSMAP-LE CONNECTION ORIENTED INFORMATION message which includes a BTS timing advance (TA) accuracy ($271_1$) estimated by the BTS. An advantage of the BSS performing this operation is that it enables a SMLC to make a better estimate of the accuracy of the estimated position of the mobile station.

In still yet another aspect, the present disclosure provides a method in a BSS which includes a BTS and is configured to interact with a SMLC. The method comprises a transmitting step. In the transmitting step, the BSS transmits, to the SMLC, a BSSMAP-LE CONNECTION ORIENTED INFORMATION message which includes a BTS timing advance (TA) accuracy ($271_1$) estimated by the BTS. An advantage of the BSS performing this step is that it enables a SMLC to make a better estimate of the accuracy of the estimated position of the mobile station.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 4 illustrates details of a BSSMAP-LE PERFORM LOCATION REQUEST message with a MS Symbol Granularity Capability IE (MS Synchronization Accuracy IE) in accordance with an embodiment of the present disclosure;

FIGS. 6A-6B illustrate details of a MS Radio Access Capability IE which includes the MS Symbol Granularity Capability IE (MS Synchronization Accuracy IE) in accordance with an embodiment of the present disclosure;

FIG. 7 is a diagram that illustrates a Multilateration TA (MTA) IE which includes an estimated BTS TA value and a BSS Granularity Capability in accordance with an embodiment of the present disclosure;

DETAILED DESCRIPTION

Figure 1:
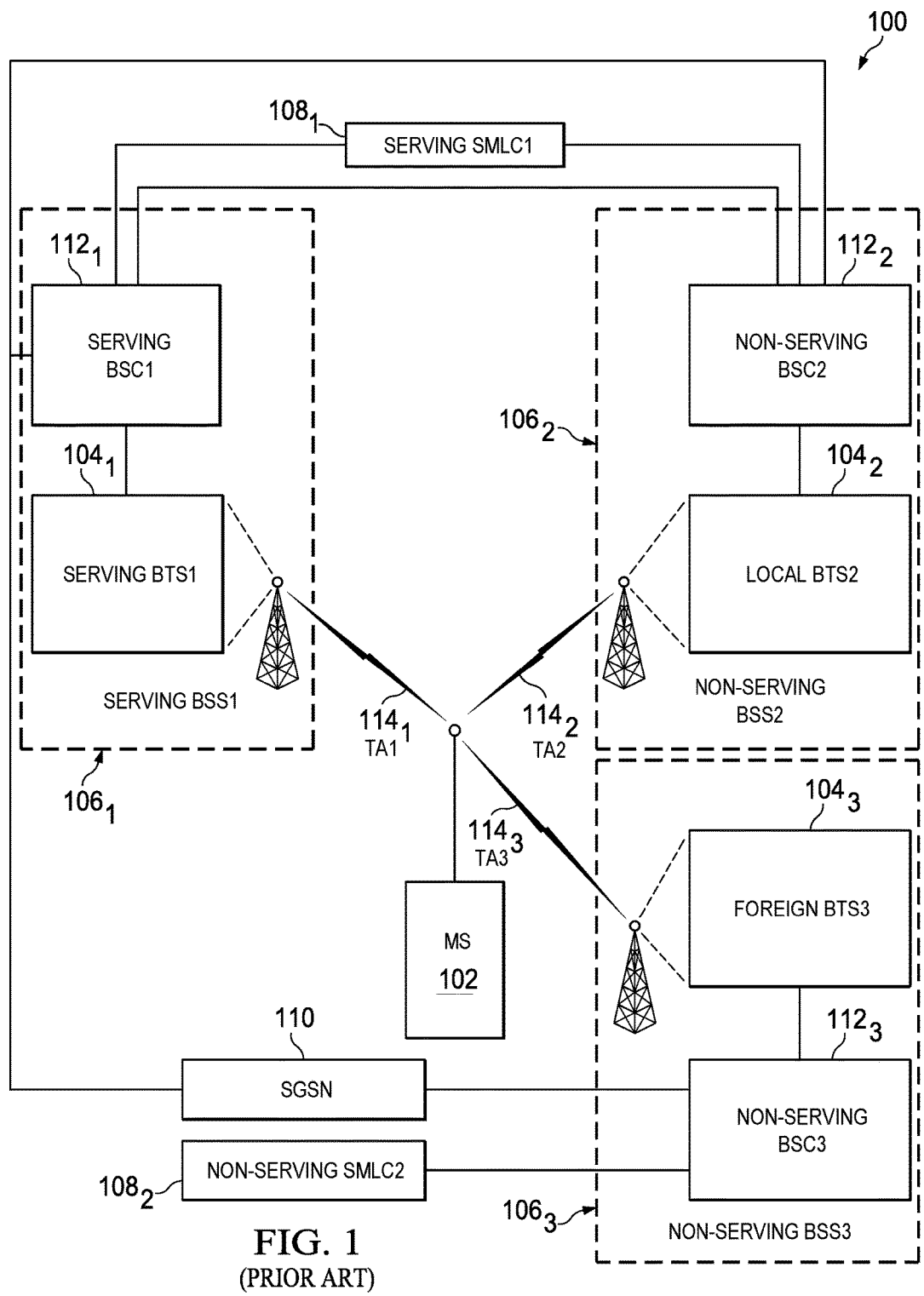
FIG. 1 (PRIOR ART) is a diagram of an exemplary wireless communication network used to help explain a problem associated with the traditional multilateration process in determining a position of a mobile station.
Figure 2:
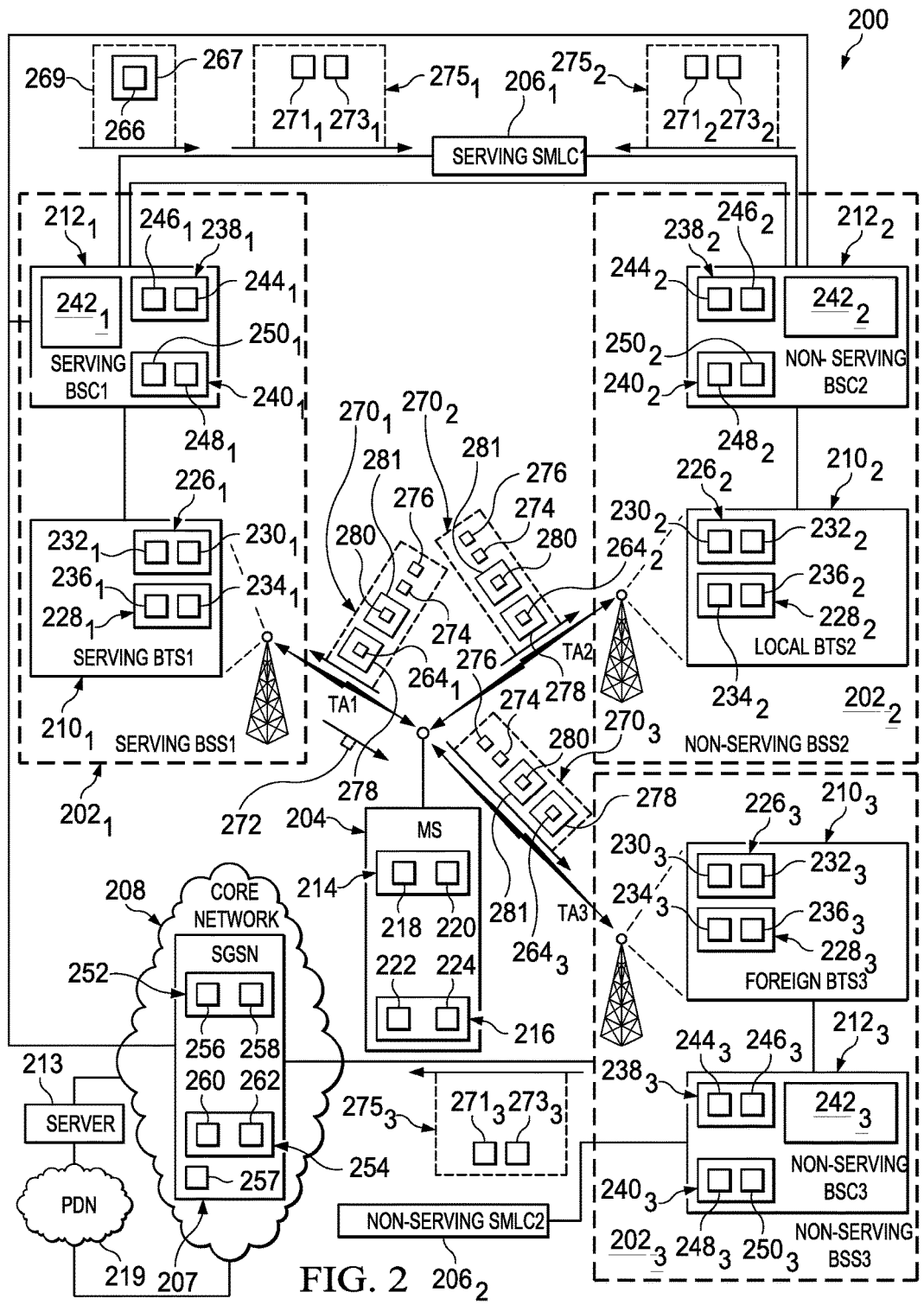
FIG. 2 is a diagram of an exemplary wireless communication network which includes a SGSN, multiple SMLCs, multiple BSSs, and a mobile station which are configured in accordance with an embodiment of the present disclosure.

A discussion is provided herein first to describe an exemplary wireless communication network 200 that includes multiple BSSs $202_1$, $202_2$, $202_3$, a mobile station 204, and multiple SMLCs $206_1$ and $206_2$ configured to improve the accuracy in estimating a position of the mobile station 204 in accordance with an embodiment of the present disclosure (see FIG. 2). Then, a discussion is provided to disclose various techniques that the BSSs $202_1$, $202_2$, $202_3$, and the mobile station 204 can use to enable the serving SMLC $206_1$ to improve the accuracy in estimating a position of the mobile station 204 in accordance with different embodiments of the present disclosure (see FIGS. 3-7). Thereafter, a discussion is provided to explain the basic functionalities-configurations of the mobile station 204 and the BSSs $202_1$, $202_2$, $202_3$, each of which are configured to improve the accuracy in which the serving SMLC $206_1$ can estimate a position of the mobile station 204 in accordance with different embodiments of the present disclosure (see FIGS. 8-15).

Exemplary Wireless Communication Network 200

Referring to FIG. 2, there is illustrated an exemplary wireless communication network 200 in accordance with the present disclosure. The wireless communication network 200 includes a core network (CN) 208 (which comprises at least one CN node 207 (e.g., SGSN 207)), multiple SMLCs $206_1$ and $206_2$, and multiple BSSs $202_1$, $202_2$, $202_3$, (only three shown) which interface with a mobile station 204 (only one shown) (note: in practice there would be multiple mobile stations 204 but for clarity only one mobile station 204 is discussed herein). The wireless communication network 200 also includes many well-known components, but for clarity, only the components needed to describe the features of the present disclosure are described herein. Further, the wireless communication network 200 is described herein as being a GSM/EGPRS wireless communication network 200 which is also known as an EDGE wireless communication network 200. However, those skilled in the art will readily appreciate that the techniques of the present disclosure which are applied to the GSM/EGPRS wireless communication network 200 are generally applicable to other types of wireless communication systems, including, for example, EC-GSM, WCDMA, LTE, and WiMAX systems.

The wireless communication network 200 includes the BSSs $202_1$, $202_2$, $202_3$ (which are basically wireless access nodes $202_1$, $202_2$, $202_3$, RAN nodes $202_1$, $202_2$, $202_3$, wireless access points $202_1$, $202_2$, $202_3$) which can provide network access to the mobile station 204. Each BSS $202_1$, $202_2$, $202_3$ includes one or more BTSs $210_1$, $210_2$, $210_3$ and a BSC $212_1$, $212_2$, $212_3$. The BSSs $202_1$, $202_2$, $202_3$ are connected to the core network 208 and, in particular, to the CN node 207 (e.g., SGSN 207). The core network 208 is connected to an external packet data network (PDN) 219, such as the Internet, and a server 213 (only one shown). The mobile station 204 may communicate with one or more servers 213 (only one shown) connected to the core network 208 and/or the PDN 219.

The mobile station 204 may be referred to generally as an end terminal (user) that attaches to the wireless communication network 200, and may refer to either a Machine Type Communications (MTC) device (e.g., a smart meter) or a non-MTC device. Further, the term "mobile station" is generally intended to be synonymous with the term mobile device, wireless device, "User Equipment," or UE, as that term is used by 3GPP, and includes standalone mobile stations, such as terminals, cell phones, smart phones, tablets, Internet of Things (IoT) devices, cellular IoT devices, and wireless-equipped personal digital assistants, as well as wireless cards or modules that are designed for attachment to or insertion into another electronic device, such as a personal computer, electrical meter, etc. . . .

The mobile station 204 may include a transceiver circuit 214 for communicating with the BSSs $202_1$, $202_2$, $202_3$ (RAN nodes $202_1$, $202_2$, $202_3$), and a processing circuit 216 for processing signals transmitted from and received by the transceiver circuit 214 and for controlling the operation of the mobile station 204. The transceiver circuit 214 may include a transmitter 218 and a receiver 220, which may operate according to any standard, e.g., the GSM/EDGE standard, and the EC-GSM standard. The processing circuit 216 may include a processor 222 and a memory 224 for storing program code for controlling the operation of the mobile station 204. The program code may include code for performing the procedures as described hereinafter.

Each BTS $210_1$, $210_2$, $210_3$ may include a transceiver circuit $226_1$, $226_2$, $226_3$ for communicating with the mobile station 204 (typically multiple mobile stations 204—only one shown for clarity) and their respective BSC $212_1$, $212_2$, $212_3$, a processing circuit $228_1$, $228_2$, $228_3$ for processing signals transmitted from and received by the transceiver circuit $226_1$, $226_2$, $226_3$ and for controlling the operation of the corresponding BTS $210_1$, $210_2$, $210_3$. The transceiver circuit $226_1$, $226_2$, $226_3$ may include a transmitter $230_1$, $230_2$, $230_3$ and a receiver $232_1$, $232_2$, $232_3$, which may operate according to any standard, e.g., the GSM/EDGE standard, and the EC-GSM standard. The processing circuit $228_1$, $228_2$, $228_3$ may include a processor $234_1$, $234_2$, $234_3$, and a memory $236_1$, $236_2$, $236_3$ for storing program code for controlling the operation of the corresponding BTS $210_1$, $210_2$, $210_3$. The program code may include code for performing the procedures as described hereinafter.

Each BSC $212_1$, $212_2$, $212_3$ may include a transceiver circuit $238_1$, $238_2$, $238_3$ for communicating with their respective BTS $210_1$, $210_2$, $210_3$ and SMLC $206_1$, $206_2$, a processing circuit $240_1$, $240_2$, $240_3$ for processing signals transmitted from and received by the transceiver circuit $238_1$, $238_2$, $238_3$ and for controlling the operation of the corresponding BSC $212_1$, $212_2$, $212_3$, and a network interface $242_1$, $242_2$, $242_3$ for communicating with the SGSN 207 part of the core network 208. The transceiver circuit $238_1$, $238_2$, $238_3$ may include a transmitter $244_1$, $244_2$, $244_3$ and a receiver $246_1$, $246_2$, $246_3$, which may operate according to any standard, e.g., the GSM/EDGE standard (in this example), and the EC-GSM standard. The processing circuit $240_1$, $240_2$, $240_3$ may include a processor $248_1$, $248_2$, $248_3$, and a memory $250_1$, $250_2$, $250_3$ for storing program code for controlling the operation of the corresponding BSC $212_1$, $212_2$, $212_3$. The program code may include code for performing the procedures as described hereinafter.

Note: for purposes of the discussion herein, it should be appreciated that the BSS $202_1$, $202_2$, $202_3$ circuitry can be considered to be the same circuitry as BSC $212_1$, $212_2$, $212_3$ (it should be appreciated that a BSS comprises a BSC and a BTS according to well-known prior art, so when there is a discussion herein about a BSS performing certain functions, it typically means the BSC performing those functions unless it is specifically mentioned that the BTS is performing a function).

The CN node 207 (e.g., SGSN 207, Mobility Management Entity (MME) 207) may include a transceiver circuit 252 for communicating with the BSSs $202_1$, $202_2$, $202_3$, a processing circuit 254 for processing signals transmitted from and received by the transceiver circuit 252 and for controlling the operation of the CN node 207, and a network interface 257 for communicating with the PDN 219 or the server 213. The transceiver circuit 252 may include a transmitter 256 and a receiver 258, which may operate according to any standard, e.g., the GSM/EDGE standard (in this example), and the EC-GSM standard. The processing circuit 254 may include a processor 260 and a memory 262 for storing program code for controlling the operation of the CN node 207. The program code may include code for performing the procedures as described hereinafter.

Techniques for Improving Accuracy of Mobile Station's Estimated Position

Brief Description

In accordance with an embodiment of the present disclosure, the MS 204 when synchronizing to a BTS $210_1$, $210_2$, $210_3$ (three shown) also estimates the accuracy $264_1$, $264_2$, $264_3$ by which it has synchronized to the BTS $210_1$, $210_2$, $210_3$. The MS 204 reports (e.g., in an uplink Radio Link Control (RLC) data block $270_1$, $270_2$, $270_3$) the estimated synchronization accuracy $264_1$, $264_2$, $264_3$ associated with the respective BTS $210_1$, $210_2$, $210_3$ to the network (e.g., BSS $202_1$, $202_2$, $202_3$). The estimated synchronization accuracy $264_1$, $264_2$, $264_3$ is forwarded by the network (e.g., BSS $202_1$, $202_2$, $202_3$) to the serving SMLC $206_1$ and taken into account by the serving SMLC $206_1$ when estimating the accuracy of the estimated position of the MS 204. Alternatively, in another embodiment of the present disclosure in order to address scenarios where the MS 204 is not able to provide an estimate of the MS synchronization accuracy $264_1$ to the serving SMLC $206_1$, instead there is provided to the serving SMLC $206_1$ an a priori understanding of the MS capability, by having the serving BSS $202_1$ use a field 266 (MS Symbol Granularity/MS Synchronization Accuracy 266 that indicates the worst case synchronization accuracy of MS 204) which can be added to a MS Radio Access Capability Information Element (IE) 267 and sent to the serving SMLC $206_1$ (see 3GPP TS 24.008 v14.1.0 which discloses the traditional MS Radio Access Capability IE without the new MS Symbol Granularity/MS Synchronization Accuracy 266—the contents of which are incorporated herein by reference). It is further proposed in yet another embodiment of the present disclosure that the serving BSS $202_1$ passes either the complete MS Radio Access Capability IE 267 or the MS Symbol Granularity field 266 in a BSSMAP-LE PERFORM-LOCATION-REQUEST Protocol Data Unit (PDU) 269 to the serving SMLC $206_1$ prior to the serving SMLC $206_1$ triggering multilateration for the MS 204 (e.g., sending the MS 204 a multilateration request 272).

Moreover, in order for the serving SMLC $206_1$ to be able to accurately assess the overall MS positioning accuracy, it could also utilize a BTS TA accuracy $271_1$, $271_2$, $271_3$. To this end, it is therefore proposed in another embodiment of the present disclosure to add a means for the BSS $202_1$, $202_2$, $202_3$ to indicate its BTS's TA estimation capability $273_1$, $273_2$, $273_3$ to the serving SMLC $206_1$ in a BSSMAP-LE CONNECTION ORIENTED INFORMATION message $275_1$, $275_2$, $275_3$ either as a new IE or as part of the BSSLAP APDU (note 1: BSS $202_1$ transmits its BTS TA estimation capability directly to the serving SMLC $206_1$ within a BSSMAP-LE CONNECTION ORIENTED INFORMATION message $275_1$; the BSS $202_2$ first transmits its BTS TA estimation capability to the BSS $202_1$ using inter-BSS communication, then the BSS $202_1$ transmits the BSSMAP-LE CONNECTION ORIENTED INFORMATION message $275_2$ to the serving SMLC $206_1$ (this signaling is not shown in FIG. 2); and the BSS $202_3$ first transmits its BTS TA estimation capability to the BSS $202_1$ using the core network (e.g., SGSN 207), and the BSS $202_1$ then transmits the BSSMAP-LE CONNECTION ORIENTED INFORMATION message $275_3$ to the serving SMLC $206_1$ (this signaling is not shown in FIG. 2) (note 2: FIG. 2 shows the direct (logical) transmission of the BSSMAP-LE CONNECTION ORIENTED INFORMATION MESSAGEs $275_2$ and $275_3$ from the BSSs $202_2$ and $202_3$ to the serving SMLC $206_1$). These embodiments of the present disclosure will be discussed in more detail hereinafter.

DETAILED DESCRIPTION

As part of its synchronization process, the MS 204 estimates the synchronization accuracy $264_1$, $264_2$, $264_3$ by which it has synchronized to the BTS $210_1$, $210_2$, $210_3$ (note: the MS 204 will estimate a separate synchronization accuracy $264_1$, $264_2$, $264_3$ for each BTS $210_1$, $210_2$, $210_3$). For example, the MS 204 can estimate the synchronization accuracy $264_1$, $264_2$, $264_3$ by performing multiple synchronizations and measurements of the timing of the BTS $210_1$, $210_2$, $210_3$ and estimating the variance between these measurements. For instance, if N measurements of the timing are denoted $t_i$, i=1, ..., N, the variance of the individual measurement can be estimated using the well-known formula for unbiased sample variance:

$$s^2 = \frac{1}{N-1} \sum_{i=1}^{N} (t_i - \bar{t})^2 \quad \text{(equation no. 1)}$$

where $\bar{t}$ is the mean of $t_i$, i.e., $$\bar{t} = \frac{1}{N} \sum_{i=1}^{N} t_i \quad \text{(equation no. 2)}$$

Further, if the MS 204 finally estimates the timing of the BTS $210_1$, $210_2$, $210_3$ as the mean of the individual measurements (i.e., by $\bar{t}$), the variance of this timing estimate can be estimated by:

$$\text{var}(\bar{t}) = \frac{s^2}{N} \quad \text{(equation no. 3)}$$

When synchronization is completed, the MS 204 will access the cell and report the estimated synchronization accuracy $264_1$, $264_2$, $264_3$ to the network (e.g., the BSS $202_1$, $202_2$, $202_3$).

Each BTS $210_1$, $210_2$, $210_3$ will perform a TA estimation $271_1$, $271_2$, $271_3$ on its own based on the signal sent by the MS 204. As part of this process, the BTS $210_1$, $210_2$, $210_3$ will estimate the accuracy by which it is able to measure the timing of signals received from the MS 204. From the accuracy (BTS timing advance accuracy $271_1$, $271_2$, $271_3$) estimated by the BTS $210_1$, $210_2$, $210_3$ and the accuracy estimated by the MS 204, a total accuracy of the TA estimation can be derived. The total accuracy is delivered together with the TA estimate $264_1$, $264_2$, $264_3$ and $271_1$, $271_2$, $271_3$ to the serving SMLC $206_1$. The serving SMLC $206_1$ combines accuracy estimates of TA estimates $264_1$, $264_2$, $264_3$ and $271_1$, $271_2$, $271_3$ from multiple BTSs $210_1$, $210_2$, $210_3$ to derive an estimate of the accuracy of the positioning of the MS 204.

Figure 3:
FIG. 3 is a diagram illustrating one possible coding of a MS synchronization accuracy field which contains the mobile station estimated assessment of the BTS timing (i.e., the mobile station synchronization accuracy) in accordance with an embodiment of the present disclosure.

In a first embodiment of the present disclosure, it is proposed to also include the estimated MS synchronization accuracy $264_1$, in addition to the Temporary Logical Link Identifier (TLLI) 274 (or other MS identity) of the MS 204, in the Radio Link Control (RLC) data block $270_1$ transmitted by the MS 204 on an uplink Temporary Block Flow (TBF) established in response to an access request 272 indicating Multilateration. In order for the BSS $202_1$ (e.g., serving BSS $202_1$) to extract the MS estimated synchronization accuracy $264_1$ from the uplink RLC data block $270_1$, it is proposed that the MS 204 use a reserved length indicator 276, e.g., a length indicator 276 of value 122 in the RLC data block $270_1$ (note that any of the unused length indicators may be used). Length indicators are used to delimit upper layer PDU but may also be used to indicate the presence of additional information within the RLC data block. One example is the length indicator with a value 125, which indicates the presence of dynamic timeslot reduction control information which shall be included after the last Upper Layer PDU (see 3GPP TS 44.060 V13.3.0 (2016-09)—the contents of which are incorporated by reference herein). In the case of Multilateration, it is proposed that a Length Indicator 276 of value 122 be used in the RLC data block $270_1$ by the MS 204 to indicate the presence of "MS synchronization accuracy" field 278 (which includes the estimated MS synchronization accuracy $264_1$) in the first octet immediately following the Length Indicator 276. FIG. 3 is a diagram illustrating one possible coding of the "MS synchronization accuracy" field 278 which contains the MS estimated assessment of the BTS $210_1$ timing (i.e., the MS estimated synchronization accuracy $264_1$) in units of 1/16 of a symbol period. An alternative coding may also be used.

In a second embodiment, it is proposed to also include the estimated MS synchronization accuracy $264_2$, $264_3$, in addition to the TLLI 274 (or other MS identity) of the MS 204 and the Source Identity 280 of the Serving BSS $202_1$, in the RLC data blocks $270_2$, $270_3$ transmitted by the MS 204 on an uplink TBF established in response to an access request 272 indicating Multilateration. In order for the BSSs $202_2$, $202_3$ (e.g., non-serving BSSs $202_2$, $202_3$) to extract the estimated MS synchronization accuracy $264_2$, $264_3$ from the uplink RLC data blocks $270_2$, $270_3$, it is proposed that the MS 204 uses a reserved length indicator 276, e.g., a length indicator 276 of value 122 within the RLC data blocks $270_2$, $270_3$. In the case of Multilateration, it is proposed that a Length Indicator 276 of value 122 is used in the RLC data blocks $270_2$, $270_3$ by the MS 204 to indicate the presence of the "Source Identity" field 281 and MS synchronization accuracy field 278 in the five octets immediately following the Length Indicator 276 (four octets for the Source Identity field 281 and one octet for the MS synchronization accuracy field 278). The assumption of using four octets for the Source Identity field 281 can be seen as valid if it is always sufficient to provide two octets of Location Area Code (LAC) and two octets of Cell ID information for the source identity (i.e., if it can be assumed that only cells belonging to the same Public Land Mobile Network (PLMN) are used for positioning). However, the "Source Identity" field 281 could alternatively comprise Mobile Country Code (MCC)+ Mobile Network Code (MNC)+LAC+Cell ID (i.e., a total of 7 octets) in order to address the case where knowledge of PLMN ID (MCC+MNC) is needed to forward the derived TA information $264_2$, $264_3$ and associated Cell ID information 280 from a non-serving BSS $202_2$ and $202_3$ to the serving BSS $202_1$. For a possible coding of the MS synchronization accuracy field 278, see FIG. 3.

Figure 5:
FIG. 5 illustrates details of the MS Symbol Granularity Capability IE (MS Synchronization Accuracy IE) in accordance with an embodiment of the present disclosure.

In a third embodiment, in order to address a scenario when there is no assessment of the MS synchronization accuracy $264_1$ from the MS 204, it is proposed to add means for the serving BSS $202_1$ to pass the MS Symbol Granularity Capability IE 266 (MS Synchronization Accuracy IE 266 which indicates the worst case synchronization accuracy of MS 204) to the serving SMLC $206_1$ in the BSSMAP-LE PERFORM LOCATION REQUEST message 269 sent from the serving BSS $202_1$ to the serving SMLC $206_1$. FIG. 4 illustrates details of the BSSMAP-LE PERFORM LOCATION REQUEST message 269 with the new MS Symbol Granularity Capability IE 266 (MS Synchronization Accuracy IE 266) (note: the reference to TABLE 9.1 3GPP TS 49.031 indicates that this table will be updated in the new standard to reflect the updated BSSMAP-LE PERFORM LOCATION REQUEST message 269 per the present disclosure). FIG. 5 illustrates details of the new MS Symbol Granularity Capability IE 266 (MS Synchronization Accuracy IE 266) which is a variable length information element that indicates the Multilateration symbol granularity of the target MS 204 (note: the reference to 10.34 3GPP TS 49.031 indicates that this figure will be updated in the new standard to reflect the new MS Symbol Granularity Capability IE 266 (MS Synchronization Accuracy IE 266) per the present disclosure). Alternatively, the serving BSS $202_1$ using a field 266 (MS Symbol Granularity 266/MS Synchronization Accuracy 266) that indicates the worst case synchronization accuracy of MS 204 is added to the MS Radio Access Capability IE 267 which can be forwarded from the BSS $202_1$ to the SMLC $206_1$ as received by the BSS $202_1$ from the SGSN 207. FIGS. 6A-6B illustrate details of the MS Radio Access Capability IE 267 with the new MS Symbol Granularity Capability IE 266 (MS Synchronization Accuracy IE 266) (note: the reference to TABLE 10.5.146 3GPP TS 24.008 indicates that this table will be updated in the new standard to reflect the MS Symbol Granularity Capability IE 266 per the present disclosure). In yet another alternative, the complete MS Radio Access Capability IE 267 is sent as a new IE in the BSSMAP-LE PERFORM LOCATION REQUEST message 269 or the MS Symbol Granularity Capability IE 266 is added to the Classmark Information Type 3 message already optionally included in the BSSMAP-LE PERFORM LOCATION REQUEST message 269.

In a fourth embodiment, in order for the serving SMLC $206_1$ to know the accuracy of the BSS $202_1$, $202_2$, $202_3$ (BTS $210_1$, $210_2$, $210_3$) estimation of the TA $271_1$, $271_2$, $271_3$, it is proposed to add means for the BSS $202_1$, $202_2$, $202_3$ (BTS $210_1$, $210_2$, $210_3$) to indicate its TA estimation capability $273_1$, $273_2$, $273_3$ to the serving SMLC $206_1$ in the BSSMAP-LE CONNECTION ORIENTED INFORMATION message $275_1$, $275_2$, $275_3$, either as a new IE or as part of the BSSLAP APDU. FIG. 7 is a diagram that illustrates where a new 3GPP TS 49.031 Multilateration TA (MTA) IE 277 is proposed to not only carry the estimated TA value $271_1$, $271_2$, $271_3$ but also the BSS Granularity Capability (bits 2 to 4 of octet 2) $273_1$, $273_2$, $273_3$, which indicates the symbol granularity used by the BSS $202_1$, $202_2$, $202_3$ (BTS $210_1$, $210_2$, $210_3$) when estimating TA $271_1$, $271_2$, $271_3$ (note: the "MTA High" and "MTA Low" fields carry the estimated TA value $271_1$, $271_2$, $271_3$) during the Multilateration procedure. Alternatively, the same information could also have been included in the BSSLAP APDU as a new 3GPP 48.071 Multilateration Timing Advance (MTA) message.

Figure 8:
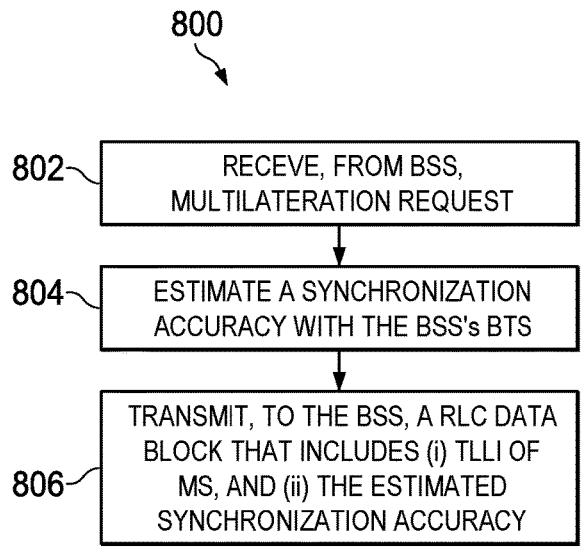
FIG. 8 is a flowchart of a method implemented in the mobile station in accordance with an embodiment of the present disclosure.

Basic Functionalities—Configurations of the MS 204 and the BSS $202_1$, $202_2$, $202_3$ Referring to FIG. 8, there is a flowchart of a method 800 implemented in the mobile station 204 that is configured to interact with BSS $202_1$ (the serving BSS $202_1$) which includes BTS $210_1$ (for example) in accordance with an embodiment of the present disclosure. At step 802, the mobile station 204 receives, from the BSS $202_1$, a multilateration request 272 (note: the serving SMLC $206_1$ originally transmits the multilateration request 272 which is then transmitted by the BSS $202_1$ to the mobile station 204). At step 804, the mobile station 204 estimates a synchronization accuracy $264_1$ with the BTS $210_1$ in response to receiving the multilateration request 272. For instance, the mobile station 204 can estimate the synchronization accuracy $264_1$ with the BTS $210_1$ by performing multiple timing measurements of the BTS $210_1$ and estimating a variance between the timing measurements of the BTS $210_1$ (note: the variance can be estimated as discussed above with respect to equation nos. 1-3). At step 806, the mobile station 204 transmits, to the BSS $202_1$, a RLC data block $270_1$ that includes at least (i) a TLLI 274 of the mobile station 204, and (ii) the estimated synchronization accuracy $264_1$. The RLC data block $270_1$ may further include (iii) a Source Identity 280 of the BSS $202_1$, and (iv) a length indicator 276 to indicate a presence of the estimated synchronization accuracy $264_1$. It should be appreciated that the mobile station 204 would also perform at least steps 804 and 806 with the non-serving BSSs $202_2$ and $202_3$.

Figure 9:
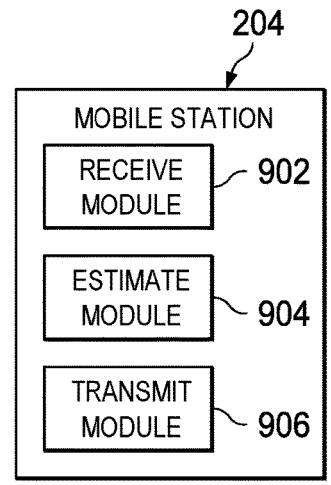
FIG. 9 is a block diagram illustrating a structure of the mobile station configured in accordance with an embodiment of the present disclosure.

Referring to FIG. 9, there is a block diagram illustrating structures of an exemplary mobile station 204 in accordance with an embodiment of the present disclosure. In one embodiment, the mobile station 204 comprises a receive module 902, an estimate module 904, and a transmit module 906. The receive module 902 is configured to receive from a BSS $202_1$ (for example) a multilateration request 272. The estimate module 904 is configured to estimate a synchronization accuracy $264_1$ with a BTS $210_1$ of the BSS $202_1$ in response to receipt of the multilateration request 272. The transmit module 906 is configured to transmit to the BSS $202_1$, a RLC data block $270_1$ that includes at least (i) a TLLI 274 of the mobile station 204, and (ii) the estimated synchronization accuracy $264_1$. The RLC data block $270_1$ may further include (iii) a Source Identity 280 of the BSS $202_1$, and (iv) a length indicator 276 to indicate a presence of the estimated synchronization accuracy $264_1$. It should be noted that the mobile station 204 may also include other components, modules or structures which are well-known, but for clarity, only the components, modules or structures needed to describe the features of the present disclosure are described herein.

As those skilled in the art will appreciate, the above-described modules 902, 904, and 906 of the mobile station 204 may be implemented separately as suitable dedicated circuits. Further, the modules 902, 904, and 906 can also be implemented using any number of dedicated circuits through functional combination or separation. In some embodiments, the modules 902, 904, and 906 may be even combined in a single application specific integrated circuit (ASIC). As an alternative software-based implementation, the mobile station 204 may comprise a memory 224, a processor 222 (including but not limited to a microprocessor, a microcontroller or a Digital Signal Processor (DSP), etc.) and a transceiver 214. The memory 224 stores machine-readable program code executable by the processor 222 to cause the mobile station 204 to perform the steps of the above-described method 800.

Figure 10:
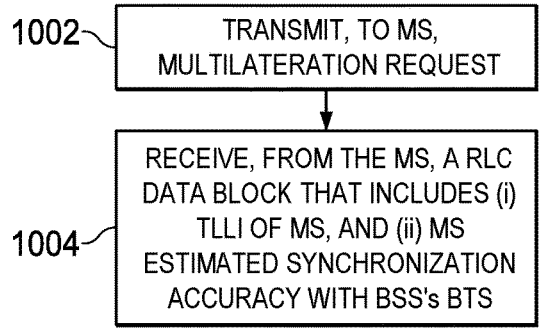
FIG. 10 is a flowchart of a method implemented in the BSS in accordance with an embodiment of the present disclosure.

Referring to FIG. 10, there is a flowchart of a method 1000 implemented in the BSS $202_1$ (for example) which includes BTS $210_1$ (for example) and is configured to interact with mobile station 204 in accordance with an embodiment of the present disclosure. At step 1002, the BSS $202_1$ transmits, to the mobile station 204, a multilateration request 272 (note: the serving SMLC $206_1$ originally transmits the multilateration request 272 which is then transmitted by the BSS $202_1$ to the mobile station 204). At step 1004, the BSS $202_1$ receives, from the mobile station 204, a RLC data block $270_1$ that includes at least (i) a TLLI 274 of the mobile station 204, and (ii) an estimated mobile station synchronization accuracy $264_1$, wherein the estimated synchronization accuracy $264_1$ indicates an estimate by the mobile station 204 of an accuracy by which the mobile station 204 is synchronized to the BTS $210_1$. The RLC data block $270_1$ may further include (iii) a Source Identity 280 of the BSS $202_1$, and (iv) a length indicator 276 to indicate a presence of the estimated synchronization accuracy $264_1$. It should be appreciated that the BSSs $202_2$ and $202_3$ would also perform at least step 1004 with the mobile station 204.

Figure 11:
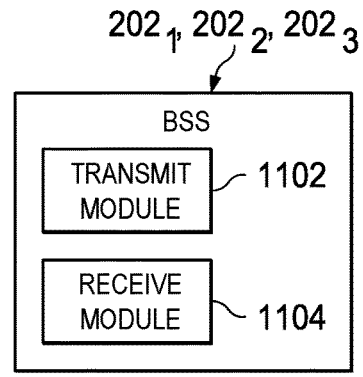
FIG. 11 is a block diagram illustrating a structure of the BSS configured in accordance with an embodiment of the present disclosure.

Referring to FIG. 11, there is a block diagram illustrating structures of an exemplary BSS $202_1$ (for example) in accordance with an embodiment of the present disclosure. In one embodiment, the BSS $202_1$ comprises a transmit module 1102 and a receive module 1104. The transmit module 1102 is configured to transmit, to the mobile station 204, a multilateration request 272. The receive module 1104 is configured to receive, from the mobile station 204, a RLC data block $270_1$ that includes at least (i) a TLLI 274 of the mobile station 204, and (ii) an estimated mobile station synchronization accuracy $264_1$, wherein the estimated synchronization accuracy $264_1$ indicates an estimate by the mobile station 204 of an accuracy by which the mobile station 204 is synchronized to the BTS $210_1$. The RLC data block $270_1$ may further include (iii) a Source Identity 280 of the BSS $202_1$, and (iv) a length indicator 276 to indicate a presence of the estimated synchronization accuracy $264_1$. It should be noted that the BSS $202_1$ may also include other components, modules or structures which are well-known, but for clarity, only the components, modules or structures needed to describe the features of the present disclosure are described herein.

As those skilled in the art will appreciate, the above-described modules 1102 and 1104 of the BSS $202_1$ may be implemented separately as suitable dedicated circuits. Further, the modules 1102 and 1104 can also be implemented using any number of dedicated circuits through functional combination or separation. In some embodiments, the modules 1102 and 1104 may be even combined in a single application specific integrated circuit (ASIC). As an alternative software-based implementation, the BSS $202_1$ may comprise a memory $250_1$, a processor $248_1$ (including but not limited to a microprocessor, a microcontroller or a Digital Signal Processor (DSP), etc.) and a transceiver $238_1$. The memory $250_1$ stores machine-readable program code executable by the processor $248_1$ to cause the BSS $202_1$ to perform the steps of the above-described method 1000. Note 1: the BSS $202_1$ in addition to performing method 1000 may also perform methods 1200 and/or 1400. Note 2: the other BSSs $202_2$ and $202_3$ may be configured the same as BSS $202_1$.

Figure 12:
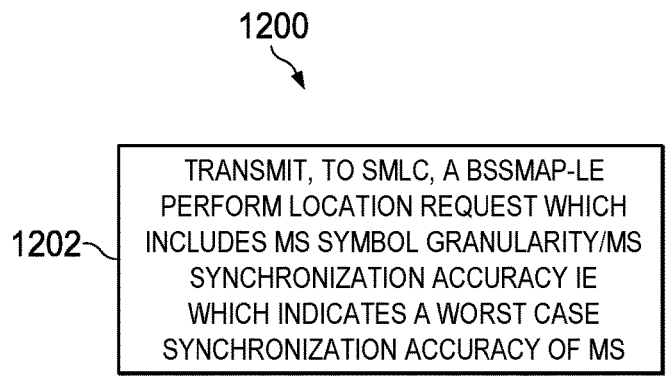
FIG. 12 is a flowchart of a method implemented in the BSS in accordance with an embodiment of the present disclosure.

Referring to FIG. 12, there is a flowchart of a method 1200 implemented in the BSS $202_1$ (for example) which is configured to interact with the SMLC $206_1$ in accordance with an embodiment of the present disclosure. At step $120_2$, the BSS $202_1$ transmits, to the SMLC $206_1$, a BSSMAP-LE PERFORM LOCATION REQUEST message 269 which includes an Information Element (IE) 266 (MS Symbol Granularity IE 266, MS Synchronization Accuracy IE 266) which indicates a worst case synchronization accuracy of a mobile station 204 (see FIGS. 4-5). In one example, the IE 266 (MS Symbol Granularity IE 266, MS Synchronization Accuracy IE 266) which indicates the worst case synchronization accuracy of the mobile station 204 is part of a MS Radio Access Capability Information Element 267 (see FIGS. 6A-6B). It should be appreciated that the BSSs $202_2$ and $202_3$ may also perform method 1200.

Figure 13:
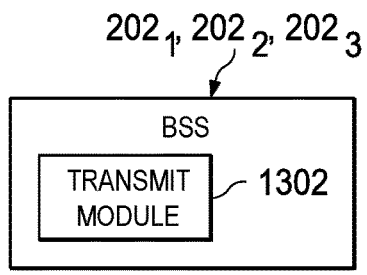
FIG. 13 is a block diagram illustrating a structure of the BSS configured in accordance with an embodiment of the present disclosure.

Referring to FIG. 13, there is a block diagram illustrating structures of an exemplary BSS $202_1$ (for example) in accordance with an embodiment of the present disclosure. In one embodiment, the BSS $202_1$ comprises a transmit module 1302. The transmit module 1302 is configured to transmit, to the SMLC $206_1$, a BSSMAP-LE PERFORM LOCATION REQUEST message 269 which includes an Information Element (IE) 266 (MS Symbol Granularity IE 266, MS Synchronization Accuracy IE 266) which indicates a worst case synchronization accuracy of a mobile station 204 (see FIGS. 4-5). In one example, the IE 266 (MS Symbol Granularity IE 266, MS Synchronization Accuracy IE 266) which indicates the worst case synchronization accuracy of the mobile station 204 is part of a MS Radio Access Capability Information Element 267 (see FIGS. 6A-6B). It should be noted that the BSS $202_1$ may also include other components, modules or structures which are well-known, but for clarity, only the components, modules or structures needed to describe the features of the present disclosure are described herein.

As those skilled in the art will appreciate, the above-described module 1302 of the BSS $202_1$ may be implemented in a suitable dedicated circuit. Further, the module 1302 can also be implemented using any number of dedicated circuits through functional combination or separation. In some embodiments, the module 1302 may be even combined in a single application specific integrated circuit (ASIC). As an alternative software-based implementation, the BSS $202_1$ may comprise a memory $250_1$, a processor $248_1$ (including but not limited to a microprocessor, a microcontroller or a Digital Signal Processor (DSP), etc.) and a transceiver $238_1$. The memory $250_1$ stores machine-readable program code executable by the processor $248_1$ to cause the BSS $202_1$ to perform the steps of the above-described method 1200. Note 1: the BSS $202_1$ in addition to performing method 1200 may also perform methods 1000 and/or 1400. Note 2: the other BSSs $202_2$ and $202_3$ may be configured the same as BSS $202_1$.

Figure 14:
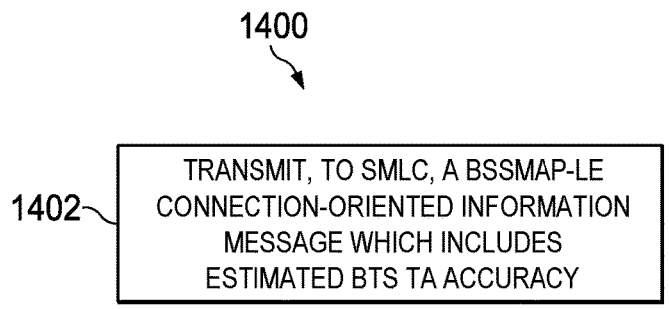
FIG. 14 is a flowchart of a method implemented in the BSS in accordance with an embodiment of the present disclosure.

Referring to FIG. 14, there is a flowchart of a method 1400 implemented in the BSS $202_1$ (for example) which includes a BTS $210_1$ (for example) and which is configured to interact with the SMLC $206_1$ in accordance with an embodiment of the present disclosure. At step 1202, the BSS $202_1$ transmits, to the SMLC $206_1$, a BSSMAP-LE CONNECTION ORIENTED INFORMATION message $275_1$ which includes a BTS TA accuracy $271_1$ estimated by the BTS $210_1$. In one example, the estimated BTS TA accuracy $271_1$ can be part of a BSSLAP APDU. It should be appreciated that the BSSs $202_2$ and $202_3$ may also perform method 1400.

Figure 15:
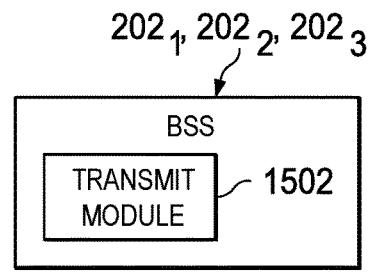
FIG. 15 is a block diagram illustrating a structure of the BSS configured in accordance with an embodiment of the present disclosure.

Referring to FIG. 15, there is a block diagram illustrating structures of an exemplary BSS $202_1$ (for example) in accordance with an embodiment of the present disclosure. In one embodiment, the BSS $202_1$ comprises a transmit module 1502. The transmit module 1502 is configured to transmit, to the SMLC $206_1$, a BSSMAP-LE CONNECTION ORIENTED INFORMATION message $275_1$ which includes a BTS TA accuracy $271_1$ estimated by the BTS $210_1$. In one example, the estimated BTS TA accuracy $271_1$ can be part of a BSSLAP APDU. It should be noted that the BSS $202_1$ may also include other components, modules or structures which are well-known, but for clarity, only the components, modules or structures needed to describe the features of the present disclosure are described herein.

As those skilled in the art will appreciate, the above-described module 1502 of the BSS $202_1$ may be implemented in a suitable dedicated circuit. Further, the module 1502 can also be implemented using any number of dedicated circuits through functional combination or separation. In some embodiments, the module 1502 may be even combined in a single application specific integrated circuit (ASIC). As an alternative software-based implementation, the BSS $202_1$ may comprise a memory $250_1$, a processor $248_1$ (including but not limited to a microprocessor, a microcontroller or a Digital Signal Processor (DSP), etc.) and a transceiver $238_1$. The memory $250_1$ stores machine-readable program code executable by the processor $248_1$ to cause the BSS $202_1$ to perform the steps of the above-described method 1400. Note 1: the BSS $202_1$ in addition to performing method 1400 may also perform methods 1000 and/or 1200. Note 2: the other BSSs $202_2$ and $202_3$ may be configured the same as BSS $202_1$.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A mobile station configured to interact with a base station subsystem (BSS), the BSS including a base transceiver station (BTS), the mobile station comprising:
a processor; and,
a memory that stores processor-executable instructions, wherein the processor interfaces with the memory to execute the processor-executable instructions, whereby the mobile station is operable to:
receive, from the BSS, a multilateration request;
in response to receipt of the multilateration request, estimate a synchronization accuracy with the BTS; and,
transmit, to the BSS, a Radio Link Control (RLC) data block that includes at least (i) a Temporary Logical Link Identifier (TLLI) of the mobile station, and (ii) the estimated synchronization accuracy.

2. The mobile station of claim 1, wherein the mobile station is operable to estimate the synchronization accuracy with the BTS by performing multiple timing measurements of the BTS and estimating a variance between the multiple timing measurements of the BTS.

3. The mobile station of claim 2, wherein the mobile station is operable to estimate the variance per the following equations:

$$s^2 = \frac{1}{N-1} \sum_{i=1}^{N} (t_i - \bar{t})^2$$

where (i) a number of the multiple timing measurements is denoted by N, (ii) the multiple timing measurements are denoted $t_i$, i=1, . . . , N, (iii) $s^2$ is an unbiased sample variance, and (iv) $\bar{t}$ is a mean of $t_i$;
where $\bar{t}$ is calculated as follows:

$$\bar{t} = \frac{1}{N} \sum_{i=1}^{N} t_i$$

and where the variance of the mean $\bar{t}$ of the multiple timing measurements is calculated as follows:

$$\text{var}(\bar{t}) = \frac{s^2}{N}.$$

4. The mobile station of claim 1, wherein the RLC data block further includes a Source Identity of the BSS.

5. The mobile station of claim 1, wherein the RLC data block further includes a length indicator to indicate a presence of the estimated synchronization accuracy.

6. A method in a mobile station configured to interact with a base station subsystem (BSS), the BSS including a base transceiver station (BTS), the method comprising:
   receiving, from the BSS, a multilateration request;
   in response to receiving the multilateration request, estimating a synchronization accuracy with the BTS; and,
   transmitting, to the BSS, a Radio Link Control (RLC) data block that includes at least (i) a Temporary Logical Link Identifier (TLLI) of the mobile station, and (ii) the estimated synchronization accuracy.

7. The method of claim 6, wherein the step of estimating further comprises performing multiple timing measurements of the BTS and estimating a variance between the multiple timing measurements of the BTS.

8. The method of claim 7, wherein the step of estimating the variance further comprises implementing the following equations:

$$s^2 = \frac{1}{N-1} \sum_{i=1}^{N} (t_i - \bar{t})^2$$

where (i) a number of the multiple timing measurements is denoted by N, (ii) the multiple timing measurements are denoted $t_i$, i=1, . . . , N, (iii) $s^2$ is an unbiased sample variance, and (iv) $\bar{t}$ is a mean of $t_i$;
where $\bar{t}$ is calculated as follows:

$$\bar{t} = \frac{1}{N} \sum_{i=1}^{N} t_i$$

and where the variance of the mean $\bar{t}$ of the multiple timing measurements is calculated as follows:

$$\text{var}(\bar{t}) = \frac{s^2}{N}.$$

9. The method of claim 6, wherein the RLC data block further includes a Source Identity of the BSS.

10. The method of claim 6, wherein the RLC data block further includes a length indicator to indicate a presence of the estimated synchronization accuracy.

11. A base station subsystem (BSS) configured to interact with a mobile station and including a base transceiver station (BTS), the BSS comprising:
   a processor; and,
   a memory that stores processor-executable instructions, wherein the processor interfaces with the memory to execute the processor-executable instructions, whereby the BSS is operable to:
      transmit, to the mobile station, a multilateration request; and,
      receive, from the mobile station, a Radio Link Control (RLC) data block that includes at least (i) a Temporary Logical Link Identifier (TLLI) of the mobile station, and (ii) an estimated mobile station synchronization accuracy, wherein the estimated mobile station synchronization accuracy indicates an estimate by the mobile station of an accuracy by which the mobile station is synchronized to the BTS.

12. The BSS of claim 11, wherein the RLC data block further includes a Source Identity of the BSS.

13. The BSS of claim 11, wherein the RLC data block further includes a length indicator to indicate a presence of the estimated mobile station synchronization accuracy.

14. A method in a base station subsystem (BSS) which includes a base transceiver station (BTS) and is configured to interact with a mobile station, the method comprising:
   transmitting, to the mobile station, a multilateration request; and,
   receiving, from the mobile station, a Radio Link Control (RLC) data block that includes at least (i) a Temporary Logical Link Identifier (TLLI) of the mobile station, and (ii) an estimated mobile station synchronization accuracy, wherein the estimated mobile station synchronization accuracy indicates an estimate by the mobile station of an accuracy by which the mobile station is synchronized to the BTS.

15. The method of claim 14, wherein the RLC data block further includes a Source Identity of the BSS.

16. The method of claim 14, wherein the RLC data block further includes a length indicator to indicate a presence of the estimated mobile station synchronization accuracy.

* * * * *